Sept. 23, 1969   R. T. J. SKINNER   3,468,333
FUEL SYSTEM FOR A GAS TURBINE ENGINE
Filed May 1, 1967

United States Patent Office 3,468,333
Patented Sept. 23, 1969

3,468,333
FUEL SYSTEM FOR A GAS TURBINE ENGINE
Robert Thomas John Skinner, Kenilworth, England, assignor to Joseph Lucas (Industries) Limited, Birmingham, England
Filed May 1, 1967, Ser. No. 634,965
Int. Cl. G05d *11/00;* F02c *7/26;* F02g *3/00*
U.S. Cl. 137—110          2 Claims

ABSTRACT OF THE DISCLOSURE

A fuel system, for a gas turbine engine, of the kind including a main burner manifold, a starter burner manifold, and a fuel pump for supplying fuel to said manifolds wherein the pump includes a body having therein a cavity housing a peripherally bladed rotor, an inlet through which fuel can enter the cavity, a pair of pumping zones defined within the cavity and a pair of outlet passages associated with said zones respectively through which fuel is pumped from said zones in response to rotation of the rotor, one of the outlet passages of the pump being connected to the main burner manifold, while the other outlet passage is connected to the starter burner manifold and to the main burner manifold through a valve which permits fuel to flow from said other passage to said main burner manifold only when the fuel pressure in said other outlet passage exceeds a predetermined value.

---

This invention relates to a fuel system, for a gas turbine engine, of the kind including a main burner manifold, a starter burner manifold, and a fuel pumping device for supplying fuel to said manifolds.

The requirements in such a system are that the flow to the starter burner manifold shall be at a substantial pressure, but at the same time the main burner manifold, which is initially empty, must be filled, though it is unimportant that flow to the main burner manifold is initially at a low pressure.

It is the object of this invention to provide a system of the kind specified in a convenient form whereby these requirements can be met.

Figure 1:
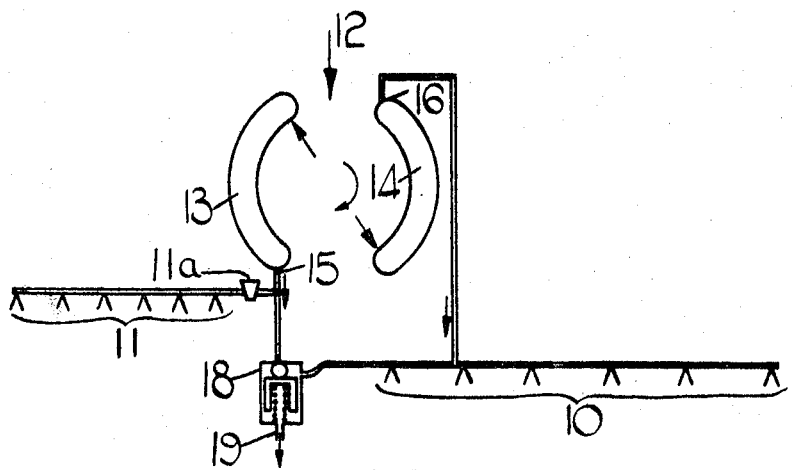
Figure 2:
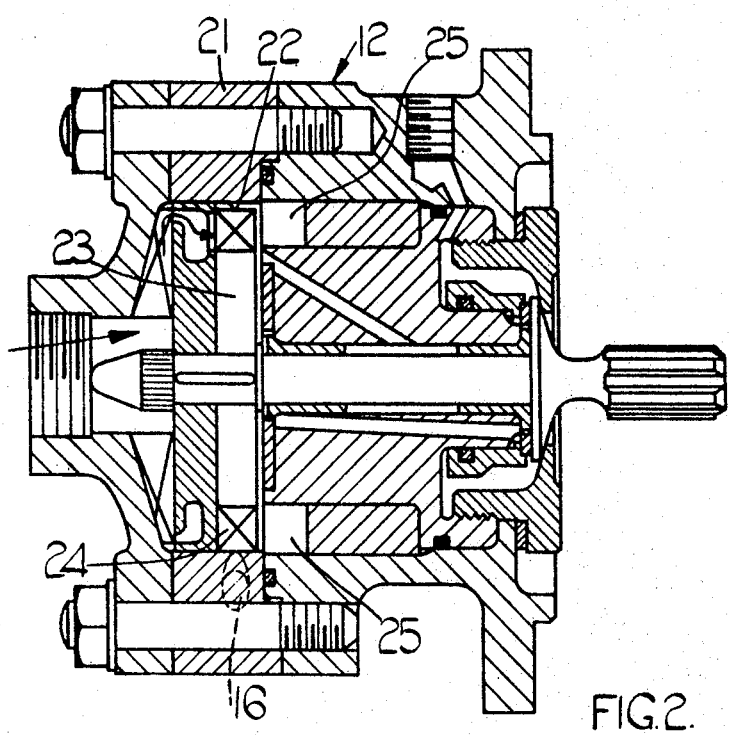

One example of the invention is illustrated in the accompanying drawings wherein FIGURE 1 is a diagrammatic representation of a fuel system for a gas turbine engine, and FIGURE 2 is a sectional view of the fuel pumping device utilized in the system shown in FIGURE 1.

Referring first to FIGURE 1, the system includes a main burner manifold 10 through which fuel is supplied to the engine during normal running of the engine, and a starter burner manifold 11 through which fuel is supplied to the engine during starting of the engine. The manifold 11 is provided with a valve 11a operable to isolate the manifold 11 from the system.

Referring now to FIGURE 2, fuel is supplied to the manifolds 10, 11 from a pumping device 12. The pumping device 12 includes a body 21 having therein a cavity 22 housing a rotor 23. The rotor 23 is formed with a plurality of peripheral radially extending blades 24 of V-shaped cross section. Moreover, the cavity 22 defines a pair of separate pumping zones indicated at 13, 14 in FIGURE 1, which are in part constituted by a pair of diametrically opposed arcuate channels 25 in one wall of the cavity 22. Fuel is supplied to the cavity 22 and as the rotor 23 rotates the fuel is swirled around the channels 25 and is pumped from the zones 13, 14 through a pair of tangential outlet passages 15, 16 associated with the zones 13, 14 respectively. The volume of the channels associated with the zones 13, 14 is variable to vary the output of the pumping device.

The passages 15, 16 are connected respectively to the manifolds 11, 10 and the passage 15 is also connected to the manifold 10 through a normally closed one way valve 18 which opens to allow fuel from the passage 15 to reach the manifold 10 when the fuel pressure in the passage 15 exceeds a predetermined value.

Prior to starting the gas turbine engine the manifolds 10, 11 will be empty since the manifolds will have been drained subsequent to a prior operation of the engine. Thus which the engine is started it will be necessary to fill the manifolds 10, 11 with fuel. Upon starting the engine the valve 11a will be open and the valve 18 closed and the pumping device 12 will commence to supply fuel to the manifolds 10, 11, the manifold 10 being supplied with fuel from the outlet passage 16 while the manifold 11 is supplied with fuel from the outlet passage 15. The manifold 11 is of smaller volume than the manifold 10 and so will fill with fuel more rapidly than the manifold 10. When the manifold 11 is filled with fuel the pressure in the passage 15 will rise until it exceeds the predetermined value at which the valve 18 opens, whereupon fuel from the passage 15 will flow not only to the manifold 11, but also to the manifold 10 through the valve 18. As soon as the manifold 10 is full the engine can operate normally and the valve 11a is then closed to isolate the manifold 11 from the system, the total output of the pumping device then being supplied to the manifold 10 from the passage 16 and from the passage 15 through the valve 18. The volume of fuel supplied to the manifold 10 can be controlled by varying the volume of the arcuate channels associated with the pumping zones 13, 14, to vary the output of the pumping device 12.

The valve 18 is provided with a drain passage 19 through which fuel seeping into the mechanism of the valve is drained, thereby ensuring that a back pressure which would affect the operation of the valve cannot be built up. The valve 11a is preferably opened and closed in response to making and breaking of the electrical circuit to the starter motor of the engine although the valve 11a could be controlled manually.

Having thus described my invention what I claim as new and desire to secure by Letters Patent is:

1. A fuel system for a gas turbine engine comprising a main burner manifold and a starter burner manifold, a pumping device for supplying fuel to the manifold, respective passages affording communication between the pumping device and the manifolds, a further passage affording communication between said first mentioned passages, a pressure responsive valve in said further passage, the valve being arranged to open to permit flow of fuel from the passage to the starter burner manifold, to that to the main burner manifold, when the pressure in the passage to the starter burner manifold reaches a predetermined value, the pumping device having a body defining a cavity, a bladed rotor within the cavity, an inlet for fuel into the body, separate pumping zones defined within the cavity, through which the rotor blades pass, the inlet being arranged to admit fuel to the zones respectively, and respective outlets from said chambers communicating with said passages to the burner manifolds respectively.

2. A fuel system as claimed in claim 1 wherein said passage to the starter burner manifold has a valve which is operable to cut off the flow of fuel to the starter burner manifold so that the total output from both zones of the pumping device is supplied to the main burner manifold.

References Cited

UNITED STATES PATENTS

| | | | |
|---|---|---|---|
| 2,832,199 | 4/1958 | Adams | 103—2 |
| 3,019,603 | 2/1962 | Kreutzer | 60—39.14 |
| 3,067,689 | 12/1962 | Hause | 103—2 |

WILLIAM F. O'DEA, Primary Examiner

W. H. WRIGHT, Assistant Examiner

U.S. Cl. X.R.

60—39.14; 137—114, 565, 119